(No Model.)

H. LUTTS.
CURCULIO CATCHER.

No. 386,546. Patented July 24, 1888.

Witnesses:
G. A. Taubesschmidt,
Wm. H. Bates.

Inventor.
Henry Lutts.
By his Attorney.
A. G. Heysmun.

UNITED STATES PATENT OFFICE.

HENRY LUTTS, OF YOUNGSTOWN, NEW YORK.

CURCULIO-CATCHER.

SPECIFICATION forming part of Letters Patent No. 386,546, dated July 24, 1888.

Application filed November 25, 1887. Serial No. 256,116. (No model.)

*To all whom it may concern:*

Be it known that I, HENRY LUTTS, a citizen of the United States of America, residing at Youngstown, in the county of Niagara, in the State of New York, have invented a new and useful Curculio-Catcher, of which the following is a specification.

My invention relates to improvements in means for catching pestiferous worms and pests which sting and destroy tender and growing fruits; and the object is to provide a cheap and reliable means for the purpose named, and which may be easily carried by a person from one tree to another, and conveniently and effectively used to do the work intended.

My invention is fully described hereinafter, and the novelty specifically pointed out in the claims.

Figure 1:
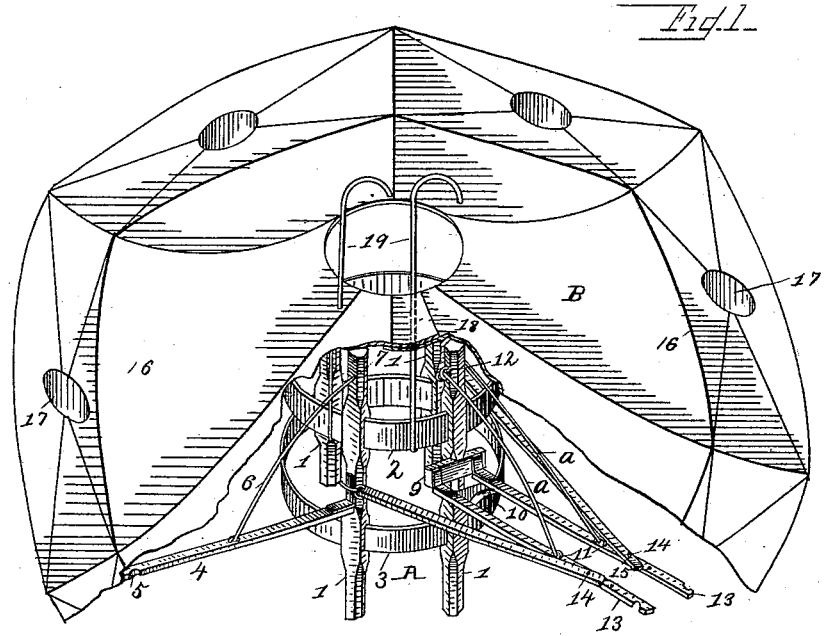
Figure 2:
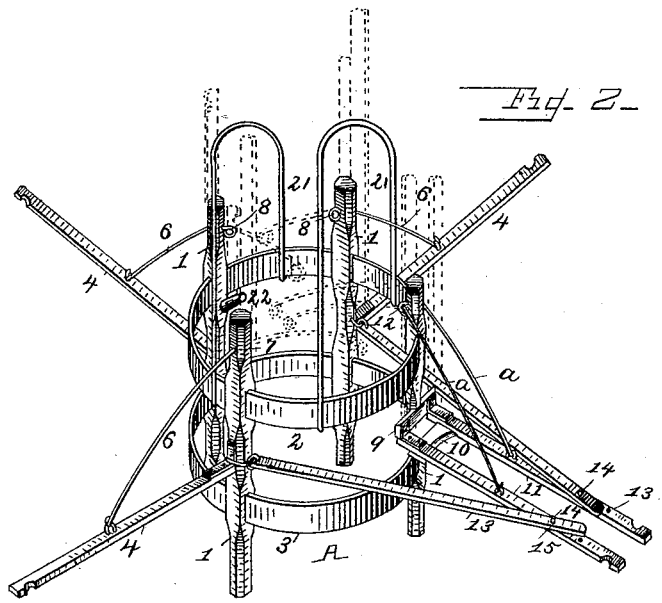

In the accompanying drawings, illustrating my improved device, Figure 1 represents a perspective thereof with a portion of the catching-cloth broken away. Fig. 2 is a similar view with the catching-cloth entirely removed and the frame spread or let down, the hinged arms or cloth-supports being shown in folded position in the dotted lines.

Reference being had to the drawings, A designates the central supporting-frame. This frame consists of four upright standards, 1, connected and held in position by upper and lower hoops, 2 3, which are preferably let through mortises or slits in the standards, substantially as shown. To three of these standards are secured arms 4, connected thereto by hinges or other pivotal supports, and to the outer ends of which are fastened the edges of the catching-cloth. At a proper point, as 5, in each of these arms 4, is hinged, or otherwise pivotally connected, a brace-rod, 6, which is passed through an eye, 7, near the top of the standard, and arranged to slide easily through the passage, but prevented from being entirely drawn out of its seat by having a nut or knob, 8, adjusted thereon. These brace-rods are of such length as to let the hinged arms drop to an angle to properly dispose or arrange the catching-cloth when spread to the desired limit.

To one of the standards 1 is rigidly fixed a cross-piece, 9, to which is hinged a cross head or piece, 10, of a pair of arms, 11, which extend therefrom in a direction nearly parallel to each other, and provided with brace-rods *a*, similar in construction to the brace-rods 6 on the other single hinged arms, excepting that the rods on the double arms 11 are arranged to slide in eyes 12 fixed in the sides of the standard.

To sustain and brace the arms 11 against lateral displacement, I provide two arms, 13, hinged at their inner ends to opposite standards, as shown, and provided at their outer ends with a pin or hook, 14, which sets in a hole, 15, in each of the double arms. These double arms 11 are intended to admit the trunk or body of a tree when the apparatus is put in position for operation.

B designates the catching-cloth. This consists of a proper textile material, cut in sections, so that when the sections are sewed together and their outer edges secured to the ends of the hinged arms the intermediate parts will form funnel-shaped depressions or pockets, as at 16, in the deepest parts of which openings 17 are made, through which the pests drop, as they roll down the cloth, into small receptacles arranged in any suitable way under the cloth. At that portion of the catching-cloth over or adjacent to the double arm 11 the edges are left free, and to one of these edges is secured a flap, 18, which is adapted to close the space between the edges of the cloth. The central opening in the catching-cloth is provided with a strap or string, 19, to secure the cloth above the shoulders and about the neck of the person carrying or using the apparatus, and from this part are arranged the suspender-straps 21, the lower ends of which are secured to the standards or about the hoops.

Instead of the suspender-straps, handles 22 may be fixed in two of the standards, and the apparatus thus carried.

The apparatus is used by a person standing in the supporting-frame and taking the catching-cloth under his arms and securing it over his shoulders. Then lifting the apparatus by the suspender-straps or handles, he approaches a tree, pushes the apparatus close to the tree, letting the trunk pass between the parallel or double arms, and then arranging the flap over the space it is intended to cover. After adjustment of the apparatus, the workman then strikes the tree a quick blow, which dislodges the pests, and they fall from the tree on the catching-cloth, and, rolling down, pass through the holes therein into the receptacles, there to be destroyed by such means as may be provided.

The arrangement of having the arms hinged to standards and provided with sliding brace-rods permits the apparatus to be folded up into a small compass and thus stowed away, and by making the supporting-frame of standards connected, as described and shown, the apparatus may be set in position and so set until ready to be removed, the operator in the meantime having his hands and arms free to do the work intended.

What I claim is—

1. The combination of the central supporting frame, composed of the upright standards and upper and lower connecting-hoops, the arms hinged to the standards, brace-rods having their outer ends hinged to the hinged arms and their inner ends arranged to slide through eyes in the standards, and a catching-cloth secured to the hinged arms and adapted to be arranged on the person at its center, substantially as described.

2. The combination of the central supporting-frame, composed of upright standards united by upper and lower hoops, 2 3, arms hinged to three of said standards and provided with brace-rods having their outer ends hinged to the arms and their inner ends arranged to slide in eyes in the standards, double arms hinged to a cross-piece on one of the upright standards and provided with hinged brace-rods arranged with their inner ends to slide in eyes in the supporting-standard, rods hinged to opposite standards and having their outer ends detachably connected to the double arms, and a catching-cloth secured to the outer ends of all the hinged arms and its central part adapted to be arranged about the person, substantially as described.

In witness whereof I have hereunto set my hand in the presence of two attesting witnesses.

HENRY LUTTS.

Witnesses:
BYRON SMITHSON,
M. A. LUTTS.